Oct. 30, 1923.  
J. C. THEBERATH  
RIM TOOL  
Filed May 6, 1921  
1,472,571  
2 Sheets-Sheet 1

Inventor  
By Joseph C. Theberath  
Hull, Brock & West  
Attys

Oct. 30, 1923.
J. C. THEBERATH
1,472,571
RIM TOOL
Filed May 6, 1921
2 Sheets-Sheet 2
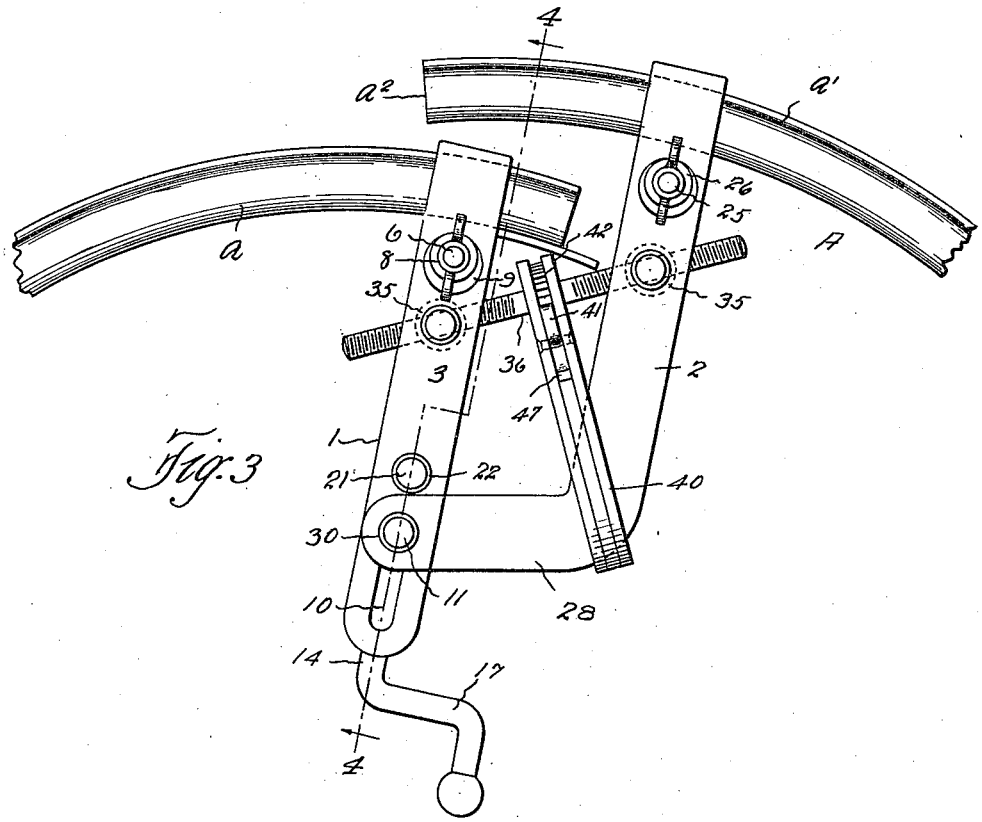
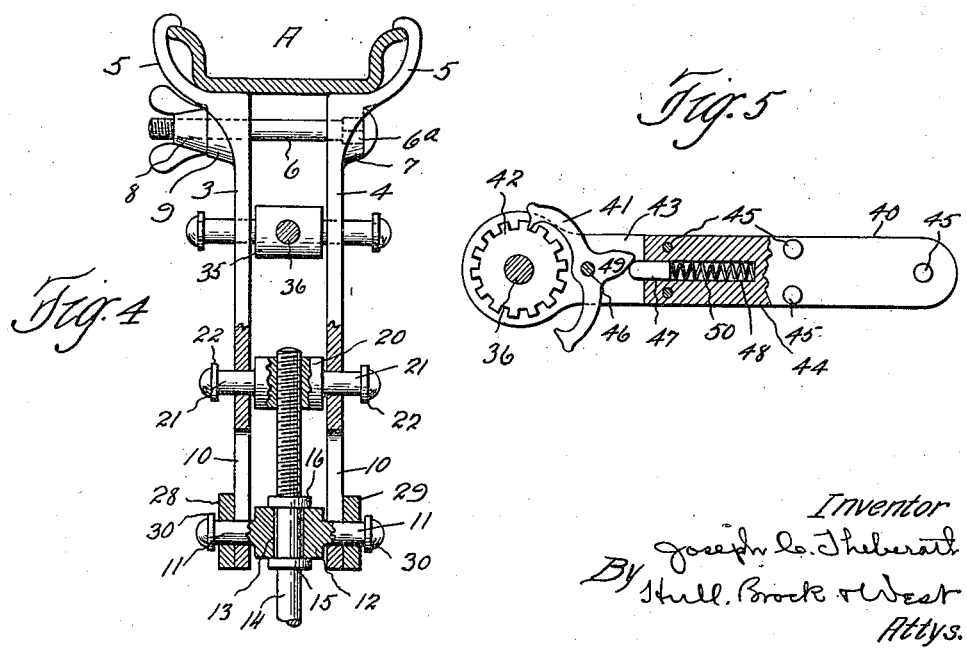
Inventor
Joseph C. Theberath
By Hull, Brock & West
Attys.

Patented Oct. 30, 1923.

1,472,571

UNITED STATES PATENT OFFICE.

JOSEPH C. THEBERATH, OF CLEVELAND, OHIO.

RIM TOOL.

Application filed May 6, 1921. Serial No. 467,481.

*To all whom it may concern:*

Be it known that I, JOSEPH C. THEBERATH, a citizen of the United States, residing at Cleveland, in the county of Cuyahoga and State of Ohio, have invented a certain new and useful Improvement in Rim Tools, of which the following is a full, clear, and exact description, reference being had to the accompanying drawings.

This invention relates to improvements in that class of devices known as rim collapsing tools which are used for contracting demountable rims of automobile wheels, and the wheels of motor trucks, preparatory to removing pneumatic tires therefrom or applying such tires thereto.

The primary object of the invention is the production of a device of the aforesaid character that may be quickly and conveniently applied to the rim and easily actuated to break the joint between the rim ends, drawing one end substantially radially inward beyond the plane of the other and overlap it with respect thereto for a material distance, and which tool serves to effectually hold the rim positively against recoil at any stage of its collapsed condition, thereby obviating a great danger which is prevalent in many of the rim collapsing tools heretofore developed.

Further objects are to provide a tool of the foregoing nature that is very strong and durable, is simple of construction and comparatively inexpensive of manufacture; is positive of operation; is adjustable to rims of various sizes; is compact so that it is adapted to be conveniently carried in the tool box of a vehicle; and through which ample power may be created to handle the largest and stiffest of rims at the expenditure of comparatively slight physical exertion.

Figure 1:
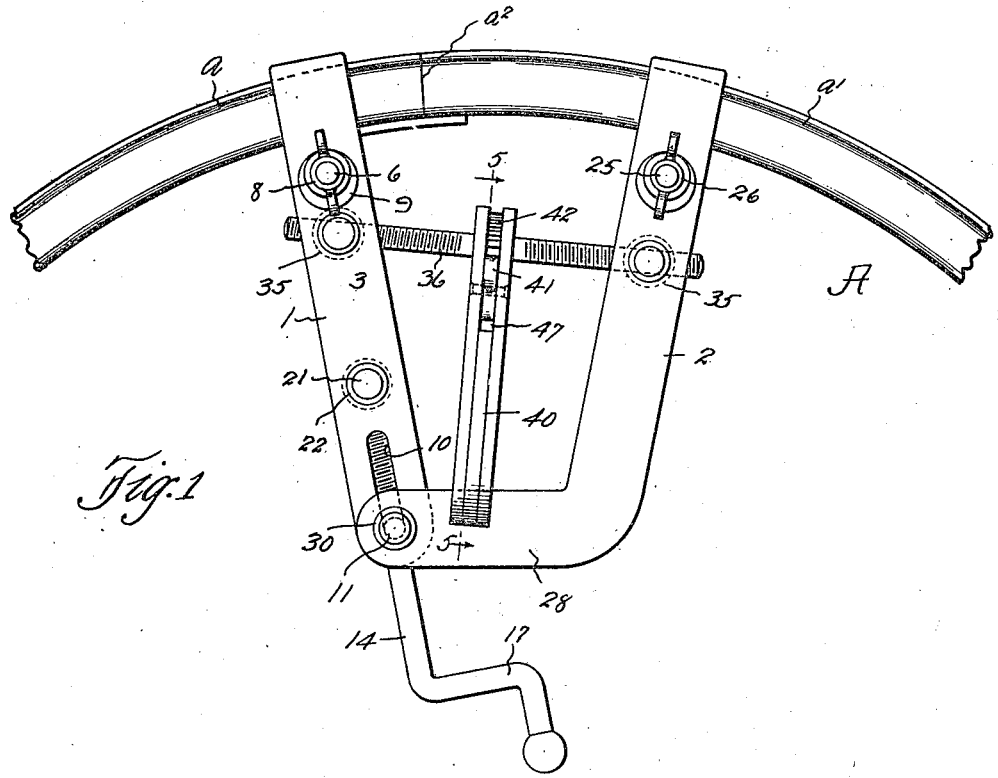
Figure 2:
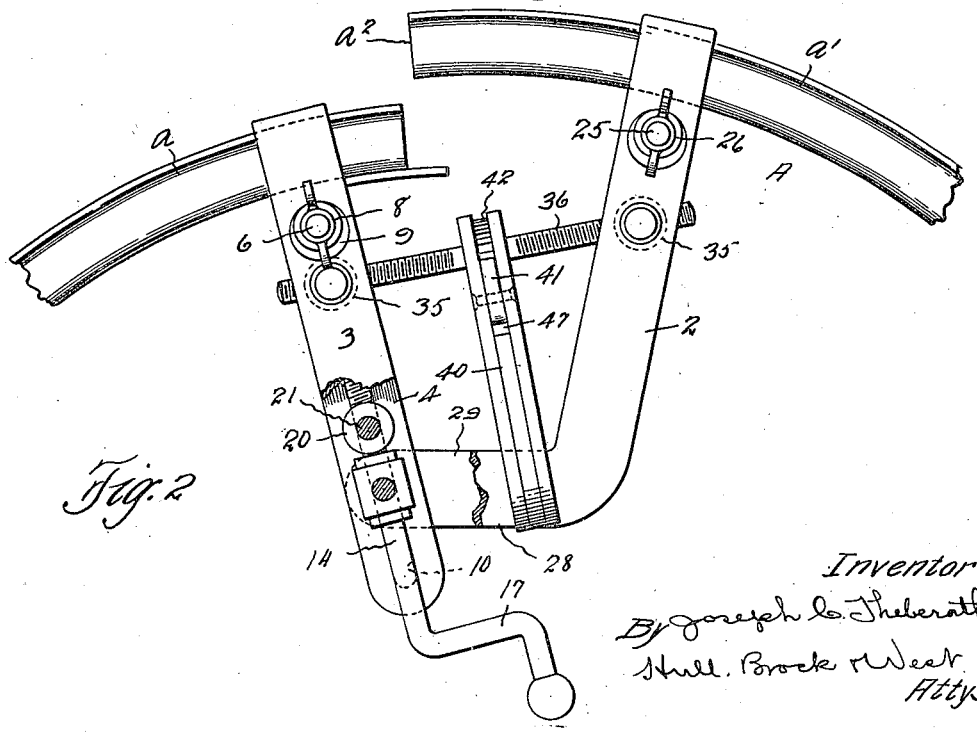

The foregoing objects, and others which will become apparent as this description proceeds, are attained in the embodiment of the invention illustrated in the drawings accompanying and forming a part hereof and wherein Fig. 1 is a side elevation of my improved rim collapsing tool applied to the adjacent ends of a split rim; Fig. 2 is a view similar to Fig. 1, showing one end of the rim offset radially with respect to the other preparatory to collapsing the rim, a part of the tool being broken away to disclose certain structural features; Fig. 3 shows the rim collapsed with its ends overlapping and the tool with its parts in the positions they assume in bringing about such condition; Fig. 4 is a sectional detail substantially on the line 4—4 of Fig. 3; while Fig. 5 is a sectional detail of the ratchet lever on the correspondingly numbered line of Fig. 1.

To the respective end portions $a$ and $a'$ of the split rim A are applied the members 1 and 2 of the collapsing tool. The former member is made up of substantially identical side plates 3 and 4 (Fig. 4) that are formed at their outer ends to provide jaws 5 designed to be engaged over the opposed side flanges of the rim A. The jaws are drawn toward each other into clamping engagement with the rim by means of a bolt 6, the same preferably being of the usual "carriage bolt" design and having the squared portion $6^a$ adjacent its head confined within a recess of corresponding shape in a boss 7 of the plate 4. A wing nut 8 is applied to the threaded end of the bolt and bears against a boss 9 of the plate 3, the parts being so proportioned that the wing nut is within the vertical plane of the outer end of the adjacent jaw 5 so as not to interfere with the rim being laid on its side with the tool applied thereto. Slots 10 are formed in the inner ends of the plates 3 and 4 and extend longitudinally thereof and accommodate trunnions 11 of a block 12 having a smooth bore 13. The shank of a screw 14 is journaled within the bore of the block 12 and is held against longitudinal movement therein by collars 15 and 16 that are carried by the screw. The outer end of the screw is equipped with a handle 17 which, in the present instance, is produced by forming the end of the screw into a crank; and the inner, threaded end of the screw has screw connection with a trunnioned nut 20, the trunnions 21 whereof extend through apertures in the side plates 3 and 4 and beyond which they are equipped with washers 22. These washers may be held against withdrawal from the trunnions by any suitable means or method, such as riveting over or upsetting the ends of the trunnions beyond the washers.

The outer end of the member 2 is substantially identical with the corresponding end of member 1 and incorporates means, involving the screw 25 and thumb nut 26, for clamping it to the rim. At its inner end, the side plates 28 and 29 whereof member 2 is formed, are turned laterally toward the member 1 and overlap the outer sides of the respective plates 3 and 4 thereof, as will be seen particularly in Fig. 4. The plates 28 and 29 have apertures that are engaged over the trunnions 11 of the block 12 and are held against withdrawal therefrom by washers 30 that are applied to the trunnions and beyond which the trunnions are shown as upset or riveted.

Carried by and between the opposed side plates of each of the members 1 and 2 and in the region of their outer ends are nuts 35 which are substantially identical, as to design, manner of mounting, and function, with the former nut 20. The reversely threaded opposite ends of a jack screw 36 are engaged within correspondingly tapped bores of the nuts 35 so that by turning said screw in one direction the members 1 and 2 may be drawn together, while by turning it in the opposite direction, said members may be forced apart. As a convenient means of actuating the jack screw 36 I employ a lever 40, shown in detail in Fig. 5, and which has a ratchet connection with the screw through the medium of a pawl 41 and a toothed wheel 42 that is rigid on the screw. The lever 40 may be made up of side plates 43 that are journaled at one end upon the body portion of the screw 36 on opposite sides of the toothed wheel 42, and which are spaced apart throughout the handle portion of the lever by a filler 44, and connected together by rivets 45 which pass through the side plates and filler. The pawl 41, which is a double ended reversible pawl, is pivoted upon a pin 46 supported by and between the plates 43, and the pawl is adapted to be yieldingly retained in a position to cause one or the other of its ends to cooperate with the teeth of the wheel 42 by means of a plunger, guided within a recess 48 of the filler 44 and which is urged toward the double cam portion 49 of the pawl by a spring 50 that is confined within the recess and compressed between the end wall thereof and the inner end of the plunger. By means of the reversible pawl, the lever 44 may be used for turning the jack screw in either direction, and to reverse the pawl for action upon the screw in reverse directions requires only the rocking of the pawl far enough to engage the desired end with the toothed wheel which automatically shifts the cam portion 49 to the opposite side of the plunger 47.

It will be noted that the trunnions of the nuts 20 and 35 are sufficiently long to permit of a separation of considerable extent between the side plates of the members 1 and 2. This is for the obvious purposes of facilitating the attachment of the device to a rim, and of adapting the tool to rims of various widths.

In the operation of the tool, the members 1 and 2 are clamped to the end portions of the rim A upon opposite sides of the split $a^2$, and the screw 14 is operated by means of its crank end 17 to draw the member 1 inwardly with respect to the member 2. At this point, attention may be called to the fact that the nut 35, carried by the member 1, is spaced nearer the rim than the nut 35 that is carried by the member 2. Consequently, when the member 1 is drawn inwardly as above described, its outer end will be caused to describe an arc about a center defined by the axis of the nut 35 of member 2, so as to force the ends of the rim slightly apart so as to avoid friction between the ends as the one is drawn inwardly with respect to the other. After the joint has been broken as described and the ends of the rim offset as illustrated in Fig. 2, the members 1 and 2 may be drawn together by oscillating the lever 40 with the pawl 41 properly set to rotate the jack screw 36 in an appropriate direction. This will result in overlapping the ends of the rim and collapsing the rim, in which condition the parts are shown in Fig. 3. It is obvious that the parts may be returned to their normal position through a reversal of the foregoing steps.

It may be explained that in some rims, as in what is known as the Kelsey rim, it is necessary to materially separate or spread apart circumferentially the ends of the rim to withdraw tenons that are carried by one end from sockets in the other before the ends can be offset radially preparatory to collapsing the rim. Such an operation is rendered exceedingly easy by means of my improved collapsing tool for, by properly setting the pawl 41 and operating the screw 36 through the lever 40, the rim ends may be forcibly separated before collapsing the rim.

Having thus described my invention, what I claim is:—

1. In a rim collapsing tool, the combination with two members, each member comprising opposed side plates, opposed jaws carried by the outer end of each of said members for engagement with a rim, means for clamping the opposed jaws of each member to one of the opposite end portions of a split rim, a block situated between the inner ends of the side plates of one of said members, the side plates of said member having slots and the block having trunnions projecting through said slots, the inner ends of the side plates of the other member having openings wherein said trunnions are journaled, a nut situated between and connected to the side plates of the former member, a screw journaled within the block and threaded through the nut, means for turning the screw, a nut situated between and connected to the side plates of each of the members adjacent its outer end, a jack screw having its ends provided, respectively, with right and left hand threads for cooperation with the last mentioned nuts, and means for rotating the jack screw.

2. In a rim collapsible tool, the combination with two members, each member comprising opposed side plates incorporating jaws at their outer ends for engagement with a rim, means for drawing the opposed side plates of each member toward each other whereby each member may be clamped to one of the opposite end portions of a split rim, a block situated between the inner ends of the side plates of one of said members the side plates of said member having slots and the block having trunnions projecting through said slots, the inner ends of the side plates of the other member having openings wherein said trunnions are journaled, a nut situated between and connected to the side plates of the former member, a screw journaled within the block and threaded through the nut, means for turning the screw, a nut situated between and connected to the side plates of each of the members adjacent its outer end, a jack screw having its ends provided, respectively, with right and left hand threads for cooperation with the last mentioned nuts, and means for rotating the jack screw.

3. In a rim collapsing tool, the combination of two members, each member comprising opposed side plates incorporating jaws at their outer ends for engagement with a rim, means for drawing the opposed side plates of each member toward each other whereby each member may be clamped to one of the opposite end portions of a split rim, a block situated between the inner ends of the side plates of one of said members and slidably connected thereto, the inner ends of the side plates of the other member being pivotally connected to said block, a nut situated between the side plates of the former member and having trunnions extending through apertures in the side plates thereof, a screw journaled within the block and threaded through the nut, means for turning the screw, a nut situated between the side plates of each of the members adjacent its outer end and having trunnions journaled within apertures of the side plates of said member, a jack screw having its ends provided, respectively, with right and left hand threads for cooperation with the last mentioned nuts, and means for rotating the screw, the trunnions of the aforesaid nuts being elongated thereby to permit separation of the side plates of each member, as and for the purpose specified.

4. In a rim collapsing tool, the combination of two members, opposed jaws carried by the outer end of each member, means for clamping the opposed jaws of each member to one of the end portions of a split rim, a block to which the inner end of one of said members is slidably connected and to which the corresponding end of the other of said members is pivotally connected, screw connections between said block and the first of said members and by means of which said member may be drawn inwardly with respect to the second member, a nut carried by each of the members adjacent its outer end, a jack screw having its ends provided, respectively, with right and left hand threads for cooperation with said nuts, and means for rotating said screw, the nut that is carried by the first of said members being nearer the outer end of said member than the nut which is carried by the second member is to the outer end of the latter member whereby when the first member is moved inwardly with respect to the second member the initial movement of its outer end will be inwardly and away from the outer end of the second member.

In testimony whereof, I hereunto affix my signature.

JOSEPH C. THEBERATH.